No. 620,347. Patented Feb. 28, 1899.
E. C. MURRAY.
HOLDER OR SUPPORTER FOR CUT FLOWERS.
(Application filed Oct. 7, 1898.)

(No Model.)

Witnesses.
Chas V. Quick
Evan B. Lewis

Inventor.
Eliza C. Murray
by Mateus D. Broesh
Attorney.

UNITED STATES PATENT OFFICE.

ELIZA C. MURRAY, OF PHILADELPHIA, PENNSYLVANIA.

HOLDER OR SUPPORTER FOR CUT FLOWERS.

SPECIFICATION forming part of Letters Patent No. 620,347, dated February 28, 1899.

Application filed October 7, 1898. Serial No. 692,962. (No model.)

*To all whom it may concern:*

Be it known that I, ELIZA C. MURRAY, a citizen of the United States, residing in the city and county of Philadelphia and State of Pennsylvania, have invented a new, useful, and Improved Holder or Supporter for Cut Flowers and Plants, of which the following is a specification.

The object of my invention is to provide a new and improved holder or supporter for cut flowers and plants, which holder or supporter may be used either in conjunction with or without a bowl or other vessel and adaptable to vessels of varying sizes and shapes and to varying quantities of flowers or plants and to varying arrangements thereof. I attain this object by the device illustrated in the accompanying drawings, in which—

Figure 1:
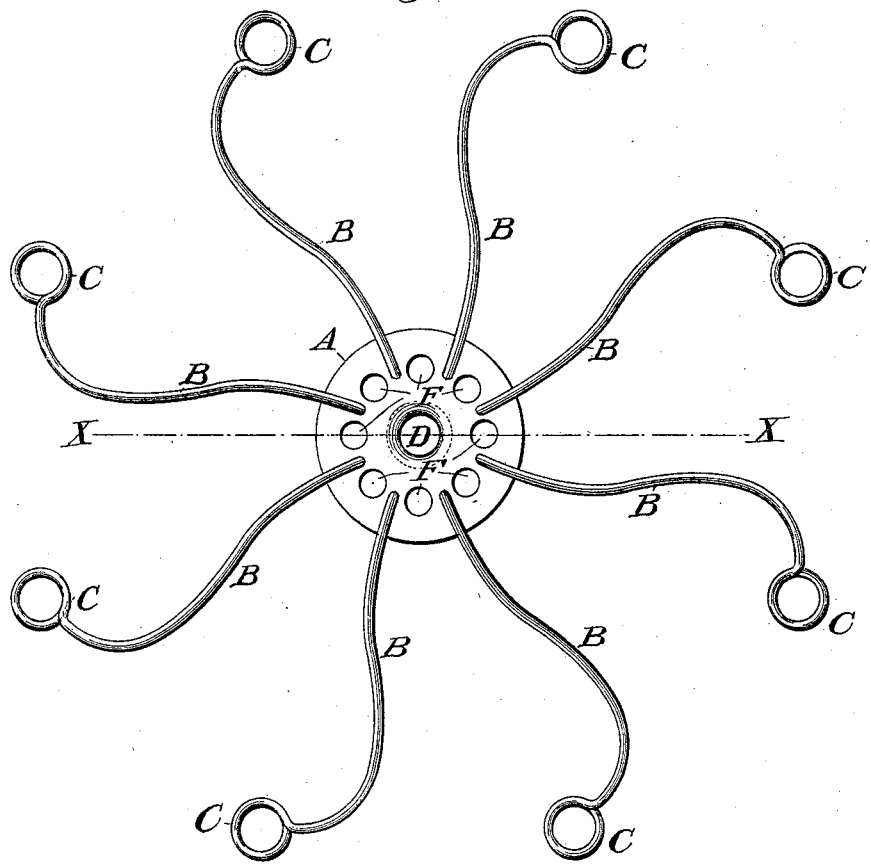
Figure 2:
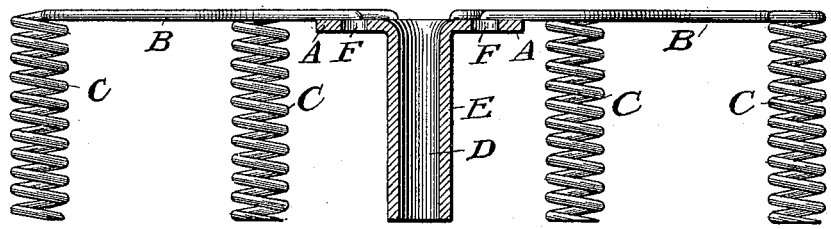

Figure 1 is a plan view of the device, showing arms springing from a central connecting-piece; and Fig. 2 is a vertical sectional view through the line X X, showing the descending coils C C C C in elevation and the central hollow cylinder E and the central connecting-piece A A in section.

Similar letters refer to similar parts throughout both the views.

A A is a central connecting-piece having a series of openings F F F F, &c., and a central opening D, to which connecting-piece are fastened in any convenient manner any desired number of flexible elastic arms B B B, &c., straight, curved, or bent, springing at any desired angle from said connecting-piece and ending in descending coils C C C, &c., which coils may be either cylindrical or conical. Descending from said connecting-piece and attached thereto in any convenient manner and continuing the central opening D is a hollow cylinder E.

In the use of my invention the arms may be bent, curved, twisted, or extended to their full length. The arms and coils may be varied in shape, length, and position relatively to each other and to the central connecting-piece either before arranging flowers and plants thereon or after such arranging, and in the use of my device or invention some of the flowers or plants are placed so as to rest on or against the arms, which thus support or hold them. Some are placed with their stems between those supported by said arms, the support thus being communicated from said arms, through the flowers or plants resting on or against them, to those between said arms, but not resting directly thereon. Some are placed on the central connecting-piece A A, their stems projecting through and into the openings F F F F, &c., and some with their stems within the openings of the coils C C C, &c.

While I have shown eight curved arms springing from the central connecting-piece A A, their number may be increased or decreased, as deemed best by the manufacturer, and they may be made at first straight, curved, or bent.

The object of making the cylinder E hollow is that it may support part of the weight of the device and permit the introduction of the stems of flowers and plants therein.

Having thus described my invention, I claim as new and desire to secure by Letters Patent—

1. In holders or supporters for cut flowers or plants, to be used with or without a bowl or other vessel, the combination of a central connecting-piece, in which is a central opening into, and continued by, a hollow cylinder, E, and a series of other openings, F F F with any desired number of arms, B B B, springing from said central piece, A A, each of which is pliable enough to acquire and retain a shape imparted to it by the user of my invention, each of said arms ending in a descending coil, C, of the same material, substantially as herein shown and described and for the purpose set forth.

2. In supporters or holders for cut flowers or plants the combination of a number of flexible arms, terminating at their free ends in descending coils, with a central connecting-piece formed with a central opening continued into a hollow cylinder, and a number of surrounding openings, substantially as described.

ELIZA C. MURRAY.

Witnesses:
CHAS. V. QUICK,
HENRY MURRAY.